United States Patent [19]

Wada

[11] Patent Number: 4,931,628
[45] Date of Patent: Jun. 5, 1990

[54] APPARATUS FOR REPRODUCING OPTICAL CARD DATA WITHOUT POSITION INDICATORS

[75] Inventor: Takuya Wada, Kanagawa, Japan

[73] Assignee: Sony Corporation, Tokyo, Japan

[21] Appl. No.: 86,628

[22] PCT Filed: Nov. 5, 1986

[86] PCT No.: PCT/JP86/00558

§ 371 Date: Jul. 17, 1987

§ 102(e) Date: Jul. 17, 1987

[87] PCT Pub. No.: WO87/03131

PCT Pub. Date: May 21, 1987

[30] Foreign Application Priority Data

Nov. 18, 1985 [JP] Japan .................. 60-256512
Sep. 8, 1986 [JP] Japan .................. 61-160588

[51] Int. Cl.$^5$ .......................... G06K 7/10; G11B 7/12
[52] U.S. Cl. .............................. 235/454; 235/456; 235/470; 369/119; 369/44.11
[58] Field of Search ............. 235/436, 440, 454, 456, 235/460, 461, 462, 467, 470, 487; 369/46, 124, 275, 118, 119; 382/9, 24, 62, 65, 67; 250/234, 236; 358/282

[56] References Cited

U.S. PATENT DOCUMENTS

| 3,553,437 | 1/1971 | Boothroyd | 235/462 |
|---|---|---|---|
| 3,870,865 | 3/1975 | Schneiderhan et al. | 235/454 |
| 4,179,621 | 12/1979 | Crean et al. | 235/454 |
| 4,289,957 | 9/1981 | Neyroud et al. | 235/454 |
| 4,298,859 | 11/1981 | Feilchenfeld | 235/456 |
| 4,424,587 | 1/1984 | Wevelsiep et al. | 235/454 |
| 4,523,093 | 6/1985 | Neumann | 250/234 |
| 4,634,850 | 1/1987 | Pierce et al. | 235/487 |
| 4,641,357 | 2/1987 | Satoh | 235/436 |
| 4,652,730 | 3/1987 | Marshall | 235/456 |
| 4,692,603 | 9/1987 | Brass et al. | 235/454 |
| 4,723,173 | 2/1988 | Tanioka | 358/282 |
| 4,742,214 | 5/1988 | Kobayashi | 235/454 |
| 4,774,400 | 9/1988 | Kimura | 235/454 |
| 4,777,356 | 10/1988 | Toyota et al. | 235/454 |

FOREIGN PATENT DOCUMENTS

| 56-103769 | 8/1981 | Japan . |
|---|---|---|
| 57-164373 | 10/1982 | Japan . |
| 60-59542 | 4/1985 | Japan . |
| 60-117424 | 6/1985 | Japan . |
| 60-191437 | 9/1985 | Japan . |
| 62-110628 | 5/1987 | Japan . |

OTHER PUBLICATIONS

International Publication No. WO 85/01818 published 04/85.

Primary Examiner—Alan Faber
Assistant Examiner—Robert A. Weinhardt
Attorney, Agent, or Firm—Hill, Van Santen, Steadman & Simpson

[57] ABSTRACT

In an optical card reproducing apparatus in which an optical card such that data is recorded as a plurality of track trains on an optical recording medium is reproduced and the data is optically detected by detecting the reflected light of the irradiated light from a light source by the optical recording medium, there are provided a memory to record the level of the output signal from the photo detector and a comparator for sequentially comparing the level of the output signal stored in this memory with the level of the output signal from the photo detector obtained by the next scan, and as the result of the comparison, when the output level from the photo detector is higher than the output level read out of the memory, the content of the memory is sequentially rewritten into the higher output level.

30 Claims, 14 Drawing Sheets

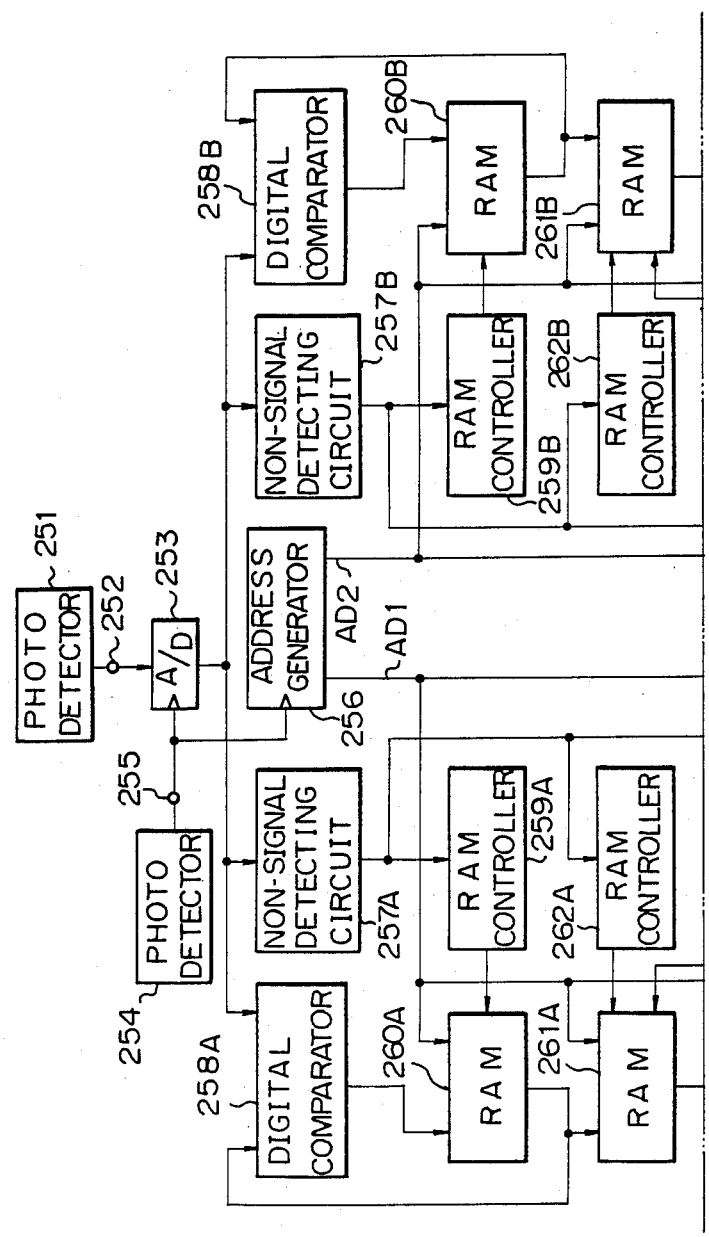

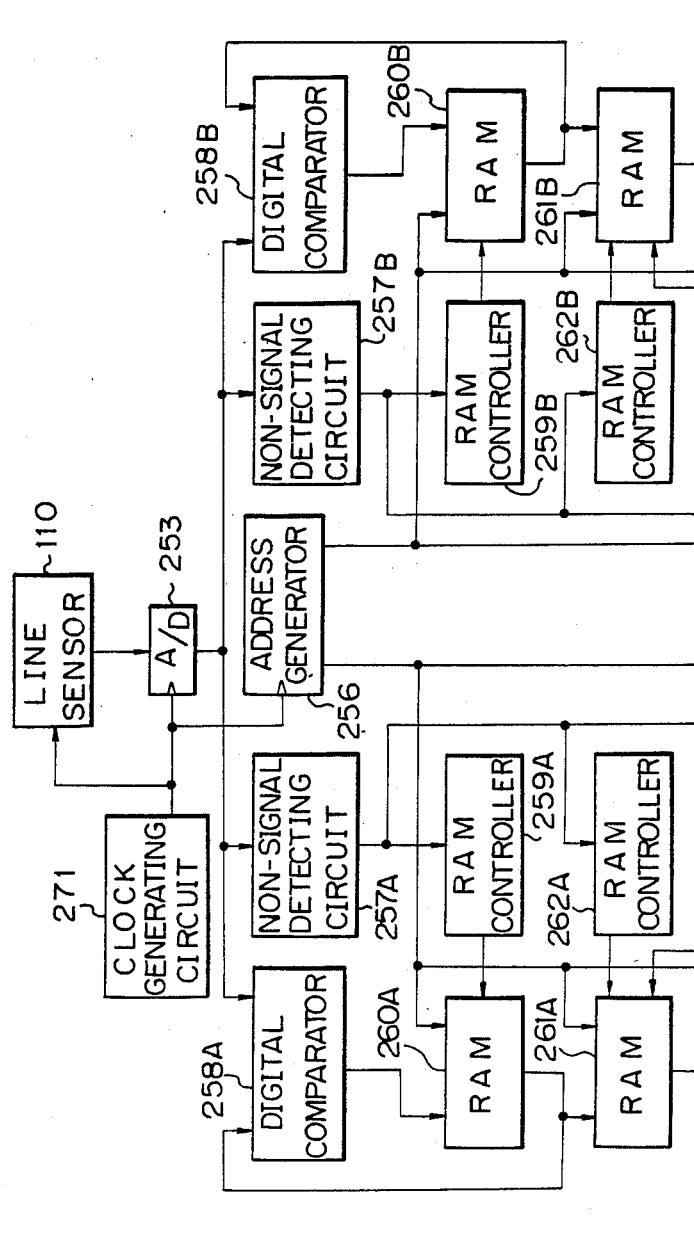

APPARATUS FOR REPRODUCING OPTICAL CARD DATA WITHOUT POSITION INDICATORS

TECHNICAL FIELD

The present invention relates to an optical card reproducing apparatus for reading out the data recorded on an optical card.

BACKGROUND ART

There has been developed an optical card in which an optical recording medium film is sputtered or evaporation deposited onto a card-shaped substrate and various data is recorded as a track train onto the optical recording medium film.

Namely, a laser beam modulated by a digital signal is scanned through a galvano mirror and irradiated onto the optical card, so that recording tracks are formed onto the optical recording medium film and data is written. The reflection factor of the portion in which the track was formed is changed in accordance with the recording data.

The data recorded on the optical card is read out by irradiating the light onto the track formed on the optical recording medium film of the optical card and by receiving the reflected light. Since the reflection factor of the portion in which the track was formed is changed in accordance with the recording data, the data can be reproduced from the reflected light. The data may be also read out in a manner such that a laser beam is scanned and irradiated along the track through a galvano mirror and the reflected light is detected by a photo detector or that the light from a light emitting element is irradiated onto the track and the reflected light is received line by line using a line sensor consisting of an image pickup device such as a charge coupled device (CCD) or the like.

This optical card is a recording medium of the WORM (write once, read mostly) type and data can be once written. However, the data cannot be erased and the rerecording cannot be performed.

It is a feature of the optical card that the memory capacity is remarkably larger than that of the magnetic card. Therefore, for example, the data indicative of the balance of the bank deposit, the data concerned with the medical patient's chart, or the like can be recorded on the optical card. In this manner, various kinds of services can be realized using the optical card.

Error correction codes are added to the recording data on the optical card to prevent the deterioration of the optical card and to improve the reliability. The error correction codes are applied in a sector unit basis so that the powerful error correction can be performed, wherein the sector is constituted by a plurality of tracks as one unit.

FIG. 1 shows such an optical card and an outline of an apparatus for reading out the optical data recorded on the optical card by use of a line sensor. Reference numeral 101 denotes an optical card and 102 denotes a stripe-shaped optical recording medium film of the optical card 101 (the shape of this film is not necessarily the stripe shape). Optical dot data is recorded in the recording stripe 102 along a plurality of recording tracks T. Numerals 104 and 104 indicate guide rollers to move the optical card 101 in the direction of an arrow a. A lens (cylindrical lens) 106 is arranged over the optical stripe so as to form the image of the dot data of the recording tracks T onto a line sensor 105.

Therefore, by feeding the optical card 101 in the direction of the arrow a by the guide rollers 104 and 104, the dot data of the recording tracks T, T, ... which were image formed on the line sensor 105 consisting of a CCD or the like can be sequentially read out.

In this case, the width of the recording track T is, e.g., about 16 μm. In general, the optical card 101 is fed at a pitch of, e.g., 2 μm by a stepping motor (not shown), thereby sequentially reading out the dot data which was image formed on the line sensor 105 by a scan signal.

Therefore, as shown in FIG. 2A, when the arrangement direction Z of the line sensor coincides with the direction X of the recording track T, the optical data can be accurately read out from the pixel signal which was read out by the scan signal when timing marks $T_s$ written in the upper and lower portions of the recording track were detected.

However, when the accuracy of the feeding mechanism of the optical card 101 is bad, as shown in FIG. 2B, the arrangement direction Z of the line sensor obliquely crosses the direction X of the recording track T, so that the optical data of the recording track T cannot be accurately read out.

As described above, hitherto, the data written on the optical card is read by a method whereby a laser beam is irradiated along the track through a galvano mirror and the reflected light is detected by a photo detector or a method whereby the light from a light emitting device is irradiated onto the track and the reflected light is received by a line sensor consisting of an image pickup device such as a CCD or the like.

In the case of reading out by scanning and irradiating a laser beam, if the laser beam is not scanned along the track, the complete recording data of one track cannot be obtained. On the other hand, in the case of using a line sensor, if the image forming angle of the line sensor does not coincide with the angle of track, the complete recording data of one track cannot be derived. The accuracy of the feeding mechanism of the optical card needs to be raised so as to make the scan direction of the laser beam coincide with the direction of the track or to make the image forming direction of the line sensor coincide with the direction of the track. However, in order to improve the accuracy of the feeding mechanism of the optical card, it is necessary to improve the dimensional accuracy of the optical card and the accuracy of the feeding mechanism of the reading apparatus. Therefore, the improvement of the accuracy of the feeding mechanism of the optical card results in an increase in cost. In addition, there is a limit of the improvement of the accuracy.

Therefore, in the case of reading out the optical card by scanning the laser beam, hitherto, the laser beam is controlled so as to scan the recording track by way of the tracking servo. On the other hand, in the case of reading out by the line sensor, for example, as shown in the Official Gazette of Japanese Patent Laid-open Publication No. 138378/86 (WO86/03611), there has been proposed a method whereby a timing signal formed on the recording track is detected, the difference between the image forming angle of the line sensor and the angle of the recording track is obtained, and the cylindrical lens to form the optical data image onto the line sensor is rotated so as to eliminate the difference.

However, as described above, in order to perform the tracking servo control and to control the image forming position of the line sensor, a circuit to perform the feedback control and an actuator for this purpose are necessary. Thus, the structure becomes complicated and the cost increases.

It is, therefore, an object of the present invention to provide an optical card reproducing apparatus which can completely reproduce the recording data even when the scan direction of the beam or the direction of the line sensor is inclined with respect to the recording track.

Another object of the invention is to provide an optical card reproducing apparatus in which there is no need to perform a complicated feedback control, the constitution is simple, and the cost can be reduced.

DISCLOSURE OF INVENTION

The present invention relates to an optical card reproducing apparatus comprising: an optical card on which data is recorded as a plurality of track trains on an optical recording medium; reproducing means having a detector to reproduce the data by detecting the reflected light from the optical recording medium of the irradiation light from a light source; clock generating means for supplying a sampling clock to the detector; and period setting means for setting a period of time for which the reproducing means reproduces the data recorded on one track among a plurality of track trains.

Even if the scan direction of the beam or the image forming direction of the line sensor does not completely coincide with the direction of the recording track, the data of one track can be completely reproduced by use of the reproduction signal which is obtained by the scanning operations of a plurality of times. The reproduction signal of the optical card is sampled by a clock corresponding to the scan position. The reproduction signal which is obtained by the scan for the interval between the scan period of the non-signal to the scan period of the non-signal is once stored into a memory and rewritten into the reproduction signal of a high level every scan. Thus, the complete reproduction signal of one track is stored into the memory.

According to the present invention, the reproduction signal of the optical card is sampled by a sampling clock corresponding to the scan position. The reproduction signal derived by the scan for the interval from the scan period of the non-signal and the scan period of the non-signal is once stored into the memory and is rewritten into the reproduction signal of a high level every scan. Even if the scan direction of the beam or the image forming direction of the line sensor does not completely coincide with the direction of the recording track, the data of one track can be completely reproduced by use of the reproduction signal which is derived by the scanning operations of a plurality of times. Thus, the complete reproduction signal of one track is stored into the memory. Therefore, even if the scan direction of the beam or the image forming direction of the line sensor does not perfectly coincide with the direction of the recording track, the recording data can be completely reproduced.

As described above, the recording data of the track can be perfectly reproduced without improving the accuracy of the feeding mechanism or performing the complicated feedback control. Therefore, the constitution can be simplified and the cost can be reduced.

BEST MODE FOR CARRYING OUT THE INVENTION

Figure 3:
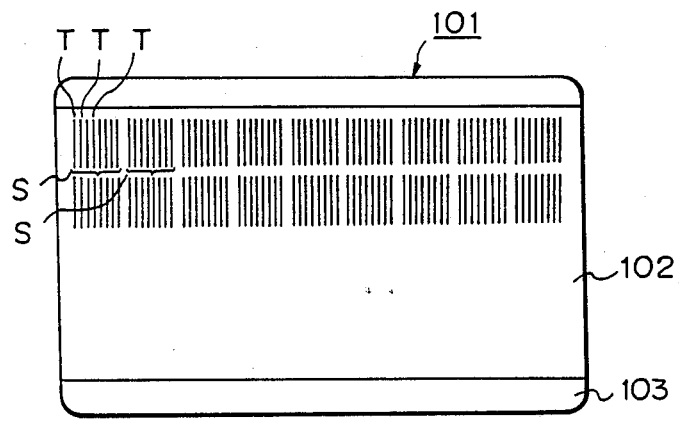
FIG. 3 is a plan view of an example of an optical card.

FIG. 3 shows the whole optical card 101. The optical card 101 is constituted such that the optical recording medium film (e.g., Te-Co film) 102 is sputtered or evaporation deposited onto a synthetic resin substrate 103 having, e.g., the light transmission property. The laser beam modulated by the digital signal is scanned through a galvano mirror and irradiated onto the optical card 101, thereby recording data. Recording tracks T are formed along the portion onto which the laser beam was irradiated, the reflection factors of the portions in which the tracks T were formed are changed in accordance with the recording data. The data recorded on the optical card 101 is read out by irradiating the light onto the track T and by detecting the reflected light.

Figure 1:
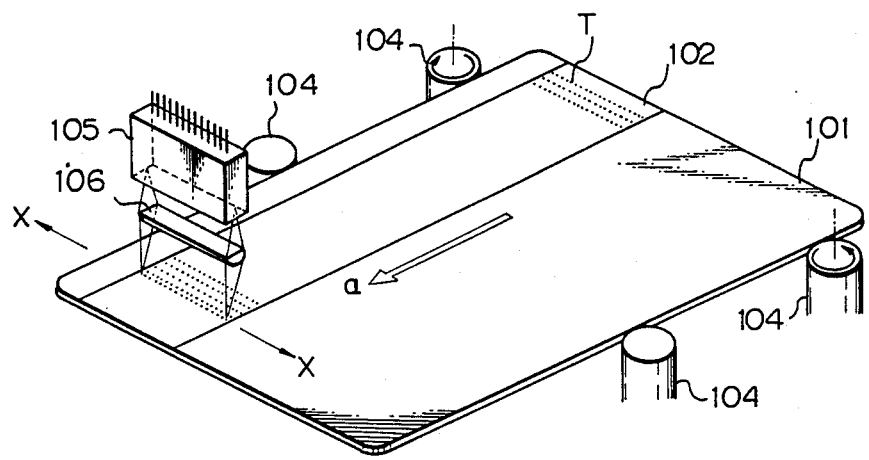
FIG. 1 is a perspective view showing an outline of an optical card reading apparatus using a line sensor.

Data is recorded as a plurality of trains of tracks T onto the optical card 101 which is used in the embodiment of the invention. In this case, the data is recorded in the direction perpendicular to the longitudinal direction of a recording medium which is formed like a stripe on the substrate as shown in FIG. 1. Or, the tracks T are recorded in the direction perpendicular to the longitudinal direction of the optical card 101 as shown in FIG. 3. One sector S consists of a plurality of tracks T. The sectors S are arranged in a matrix form on the optical card 101. The size of one sector S is 512 bytes to 4 kbytes. The recording data is interleaved using the sector S as a unit and the error correction codes are added to the recording data.

Figure 4:
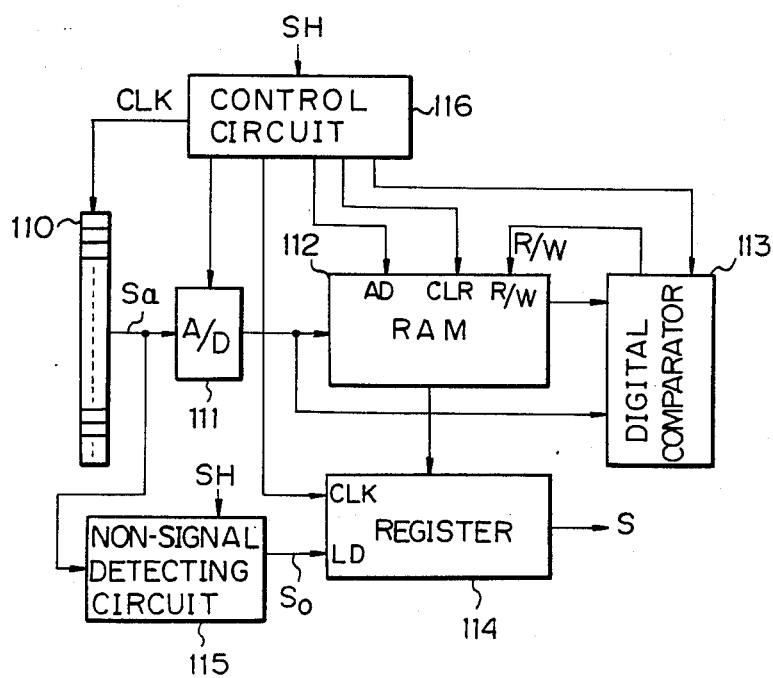
FIG. 4 is a block diagram showing the first embodiment of the present invention.

FIG. 4 shows a block diagram of the first embodiment of an optical card reproducing apparatus using a line sensor to which the invention is applied. Numeral 110 denotes a line sensor consisting of a CCD or the like; 111 is an analog-to-digital converter (A/D converter); 112 is a memory (e.g., RAM) such that digital data can be written into or read out from the designated address; 113 a digital comparator; 114 a register to which data is input in parallel and from which the data can be output as a series signal; 115 a non-signal detecting circuit to detect whether a signal exists or not every scan; and 116 a control circuit to send a clock signal and a timing signal to each section.

The operation of this embodiment will be described hereinbelow with reference to a waveform diagram of FIG. 5.

As mentioned above, the optical card is driven by a feeding mechanism so as to pass under the line sensor 110 by, e.g., eight steps between respective recording tracks. The optical data which was image formed on the line sensor every step is read out by a scan signal.

N clock signals CLK corresponding to the number of pixels for one scan period $T_L$ are supplied to the line sensor 110 and dot data $S_a$ is output as a series signal.

Figure 2A:
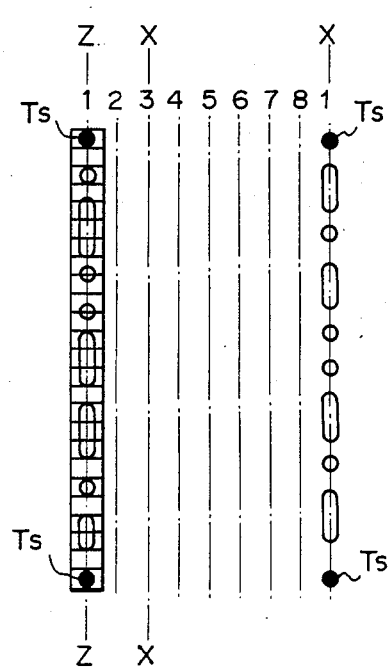
FIGS. 2A and 2B are explanatory diagrams showing the relation between the line sensor and a recording track.
Figure 2B:
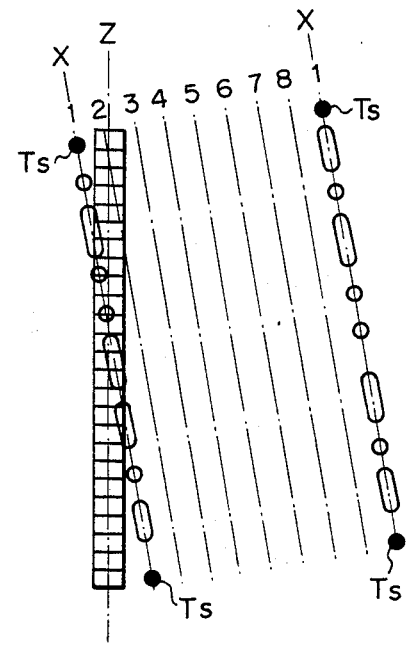
Figure 5:
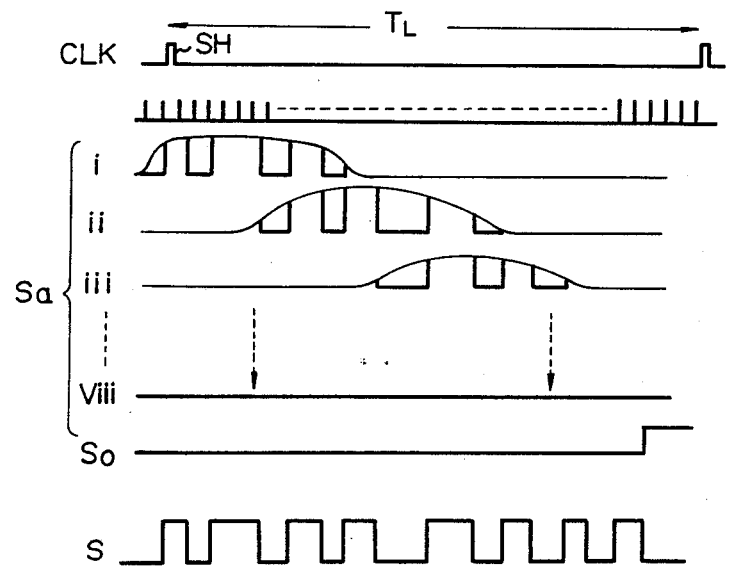
FIG. 5 is a waveform diagram which is used to explain the first embodiment of the invention.

In this case, as shown in FIG. 2B, if azimuths are caused in the direction X of the recording track and the direction Z of the line sensor, only the optical data of a part of the recording tracks T is read out every scan as shown at i, ii, iii, ... in FIG. 5. However, if the azimuth is so small that it does not overlap the adjacent recording track, all of the optical data is read out of the line sensor 110 in at least eight steps, i.e., within eight scanning operations.

In the case of this embodiment, the output of as shown at i in FIG. 5 of the dot data $S_a$ read out by the first scan signal, for example, by the signal when the timing signal $T_s$ was detected is analog-to-digital converted and thereafter, it is recorded into a predetermined address in the memory 112. This output is compared with the output as shown at ii in FIG. 5 of the dot data $S_a$ read out by the next scan by the digital comparator 113.

Namely, the data (the level of the pixel signal) in the memory 112 is sequentially output to the digital comparator 113 by a clock signal CLK to form the next scan signal and sequentially compared with the level of each pixel signal which was read out from the line sensor 110.

When the level of the pixel signal which was read out from the line sensor 110 is high, an Read/Write signal is output by the latter half portion of the clock signal and the memory is set into the writing mode. The data in that address is rewritten into the level value of the pixel signal which is read out at present.

When the pixel signal which was read out by the scan signal which is output every step is larger than the data recorded in the memory 112, the data is rewritten every address in a manner similar to the above.

Thus, all of the optical data trains of predetermined recording tracks T are written into the memory 112 at the maximum signal level until eight steps in FIG. 2B mentioned above and thereafter, the output of the line sensor 110 enters the non-signal state.

The register 114 is loaded by an output $S_0$ of the non-signal detecting circuit 115 and the content of the memory 112 is transferred and at the same time, it is output as a series signal S by the clock signal CLK. Since the series signal S includes all of the dot data of one recording track, it can be handled as a line sensor output without an azimuth. By processing the signal by a conventional signal processor, the recording data on the optical card can be known.

When the next timing signal $T_S$ is detected, the output of the first dot data i is recorded into the memory 112. The optical data of the recording track of the second train is read out by the similar operation.

Figure 6:
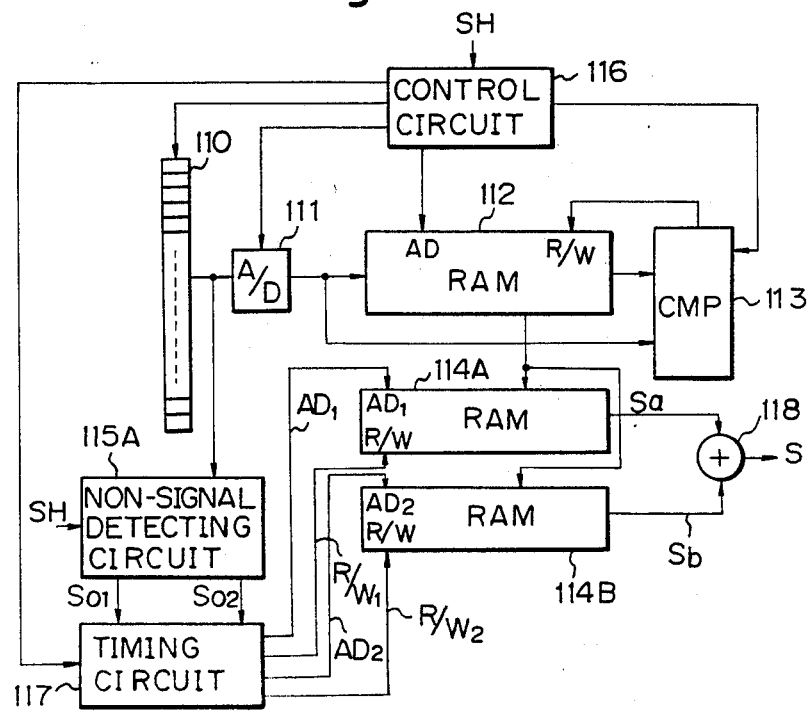
FIG. 6 is a block diagram showing the second embodiment of the invention.

FIG. 6 shows the second embodiment of an optical card reproducing apparatus using a line sensor which can be also applied to the case where an azimuth occurs between the recording tracks. The same portions as those in FIG. 4 are designated by the same reference numerals.

Figure 7:
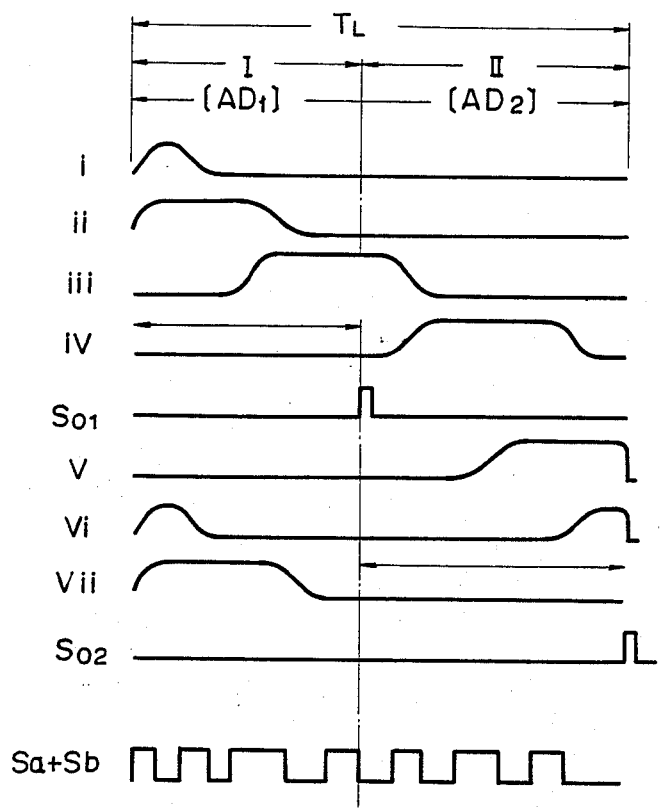
FIG. 7 is a waveform diagram which is used to explain the second embodiment of the invention.

When the azimuth value is so large that it overlaps two recording tracks, the signal which is obtained from the line sensor 110 does not include the signal of the scan train as a non-signal as shown by waveforms i, ii, . . . of the dot data $S_a$ in FIG. 7.

In the case of this embodiment, as shown in FIG. 7, one scan train is divided into, for example, the former half portion I and the latter half portion II, thereby correcting the detected dot data.

Numerals 114A and 114B show first and second RAMs in which an address signal $AD_1$ in the former half portion and an address signal $AD_2$ in the latter half portion in the memory 112 are input. Numeral 115A indicates a non-signal detecting circuit which outputs a non-signal output $S_{01}$ when the former half portion of one scan train is the non-signal and outputs a non-signal output $S_{02}$ when the latter half portion is the non-signal. Numeral 117 represents a timing circuit which outputs control signals for the reading and writing operations of the first and second RAMs 114A and 114B and the address signals $AD_1$ and $AD_2$. Numeral 118 denotes a synthesizing circuit.

Figure 8:
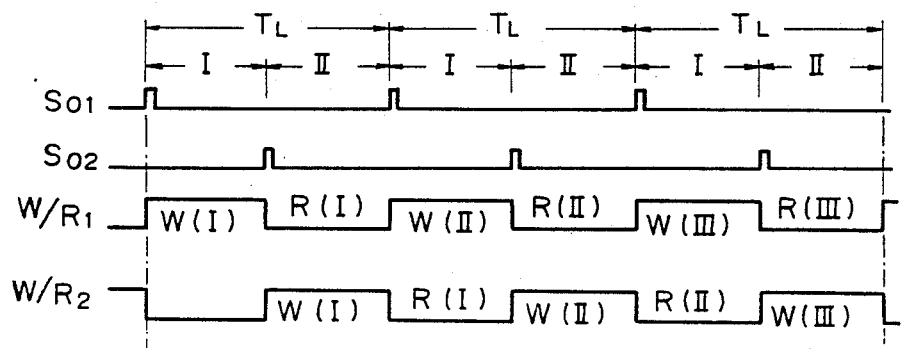
FIG. 8 is a waveform diagram which is used to explain the operation of a random access memory (RAM) in the second embodiment of the invention.

In the case of this embodiment, as shown in FIG. 7, when the non-signal output $S_{01}$ is input to the timing circuit 117 in the former half portion I of one scan train, a write signal $W/R_1$ is output, the first RAM 114A receives the corrected signals of the dot data i, ii, and iii from the memory 112 as shown in a waveform diagram of FIG. 8. When the non-signal output $S_{02}$ is input to the timing circuit 117 in the latter half portion II, the second RAM 114B receives the corrected data of the dot data as shown at iii, iv, v, and vi in FIG. 7 from the memory 112 by the write signal $W/R_2$. For this period, the stored data in the former half portion I as shown in FIG. 8 is output as a series signal $S_a$ from the first RAM 114A.

Even in the former half portion I as shown in FIG. 8 of the next scan train, after the non-signal output $S_{01}$ was detected, the dot data corrected from the memory 112 is stored into the first RAM 114A by the address signal $AD_1$. For this period, the data stored in the second RAM 114B is output as a series signal $S_b$ which was read out by the address signal $AD_2$.

Therefore, the output of the line sensor 110 which was corrected in the memory 112 is sequentially output as a series signal $S_a + S_b = S$ from the synthesizing circuit 118. This signal is input as a signal without an azimuth to the signal processor.

It will be understood from the foregoing embodiment that it is sufficient to constitute the reading circuit of the optical data in a manner such that when the azimuth between the line sensor and the recording track further increases and the dot data of a few tracks is output by one scan, the data of the memory 112 which corrects the level of the output of the line sensor to a higher level is divided into a few portions and transferred to the first, second, and third RAMs in response to the end of the non-signal period.

Figure 9:
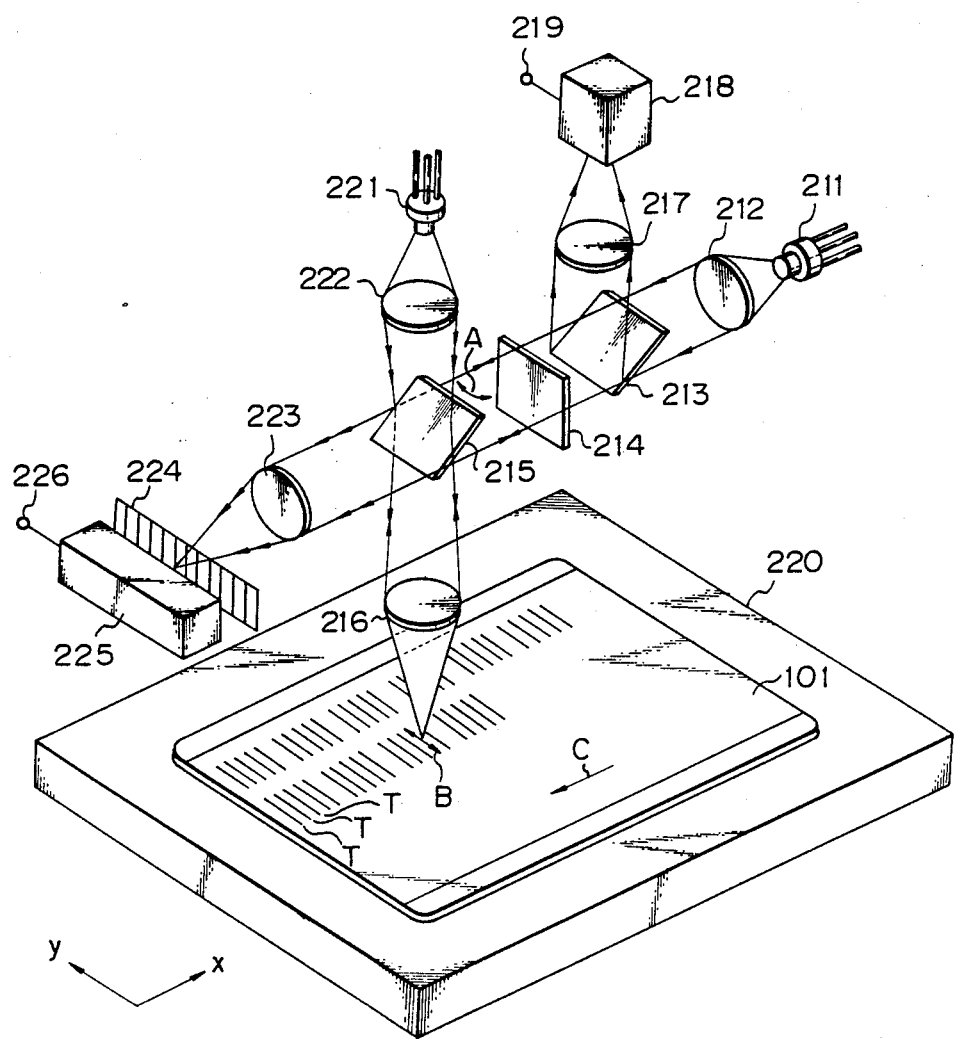
FIG. 9 is a perspective view showing an outline of a reading apparatus using a photo diode.

FIG. 9 shows an outline of an optical card reading apparatus using a photo diode to which the invention can be applied. In FIG. 9, reference numeral 211 denotes a first semiconductor laser serving as a light source to read out the data recorded on the optical card 101. A laser beam emitted from the first semiconductor laser 211 is converted into the parallel beam by a collimator lens 212 and passes through a beam splitter 213 and a ¼ wavelength plate 214 and is reflected by a galvano mirror 215. The laser beam reflected by the galvano mirror 215 is focused by an objective lens 216 and irradiated onto the track T formed on the recording medium film 102 of the optical card 101. As shown by an arrow A, the galvano mirror 215 is oscillated by a driving source for oscillation (not shown) such as an oscillating motor or the like. Thus, the laser beam to be irradiated onto the optical card 101 is scanned as shown by an arrow B.

The reflected light of the laser beam irradiated by the optical card 101 is returned to the objective lens 216 and reflected by the galvano mirror 215 and passes through the ¼ wavelength plate 214. A difference of 90° occurs between the polarizing axis of a laser beam emitted from the first semiconductor laser 211 and the polarizing axis of the reflected light from the optical card 101 by the ¼ wavelength plate 214. The beam splitter 213 reflects the reflected light from the optical card 101 in which the difference of the polarizing axis occurred at the angle of 90°. The reflected light from the optical card 101 which was reflected by the beam splitter 213 is focused by an objective lens 217 and received by a first photo detector 218 consisting of a photo diode. The photo signal is converted into an electric signal by the first photo detector 218 and output from a terminal 219.

As mentioned above, the data has been recorded as a pit train or a dot train onto each track T of the optical card 101. The reflection factor of the recording medium film 102 in the portion of the optical card 101 where the track T was formed is changed in accordance with the recording data. Therefore, as mentioned above, the laser beam from the first semiconductor laser 211 is scanned by the front surface of the galvano mirror 215 and irradiated onto the track T of the optical card 101. By detecting the reflected light by the first photo detector 218, the recording data of the optical card 101 is read.

Numeral 220 denotes a table. The table 220 has a mechanism (not shown) to suppress the oscillation in the direction perpendicular to the direction of the plane of the optical card 101. The table 220 is the table which can be moved in the x and y directions by a driving source (not shown) such as a stepping motor or the like. The optical card 101 is fed by the table 220 in a stepwise manner. On the other hand, in place of moving the optical card 101 in the x and y directions, the optical system side can be also moved. When the laser beam is scanned once, the optical card 101 is moved by the table 220 in the direction indicated by an arrow C, thereby allowing the data of the next track T to be read.

Numeral 221 denotes a second semiconductor laser provided to detect the positional data of the laser beam to be scanned onto the optical card 101. The laser beam emitted from the second semiconductor laser 221 is converted into the parallel beam by a collimator lens 222 and is reflected by the back surface of the galvano mirror 215. The laser beam reflected by the galvano mirror 215 is focused by an objective lens 223 and irradiated onto a second photo detector 225 through a one-dimensional lattice 224.

The galvano mirror 215 is oscillated as shown in the arrow A and the laser beam to be irradiated onto the optical card 101 is scanned. Thus, the laser beam which is emitted from the second semiconductor laser 221 and reflected by the mirror surface on the back surface of the galvano mirror 215 and detected by the second photo detector 225 is also scanned. Since this laser beam is irradiated onto the second photo detector 225 by the one-dimensional lattice 224, a one-dimensional lattice clock corresponding to the motion of the galvano mirror 215 is taken out from a terminal 226 of the phto detector 225. The positional data of the laser beam which is scanned onto the optical card 101 is derived from this one-dimensional lattice clock. The detection output from the second photo detector 225 is fed back to driving means (not shown) of the galvano mirror 215, thereby correcting a scanning fluctuation of the beam which is caused by a variation in oscillating speed when the galvano mirror 215 oscillates.

As mentioned above, the laser beam emitted from the first semiconductor laser 211 is scanned in parallel with the recording track T as indicated by the arrow B by the galvano mirror 215. After completion of a single scan, the optical card 101 is moved in a stepwise manner along the table 220 in the direction indicated by the arrow C. Therefore, when the scan direction of the laser beam perfectly coincides with the direction of the recording track T, the laser beam scans as shown in, e.g., FIG. 10 in association with the stepwise movement of the optical card 101 in the direction shown by the arrow C.

Figure 10:
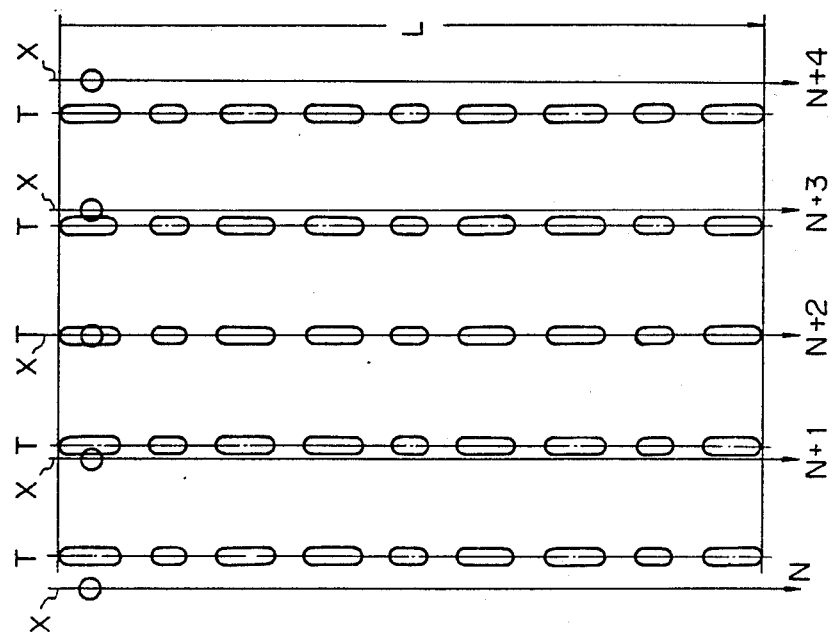
FIG. 10 is a schematic diagram which is used to explain the case where no angle difference occurs in the optical card reading apparatus using the photo diode.

Namely, as shown in FIG. 10, for the interval from the Nth scan to the (N+2)th scan, the scan locus X of the laser beam approaches the center of the track T each time the optical card 101 is moved in the direction shown by the arrow C. At the time of the (N+2)th scan, the scan locus X of the laser beam substantially coincides with the center of the track T. After completion of the (N+2)th scan, the scan locus X of the laser beam is away from the center of the track T each time the optical card 101 is moved in the direction of the arrow C. After the (N+4)th scan, the scan locus X approaches the center of the next track of the track T.

Figure 11:
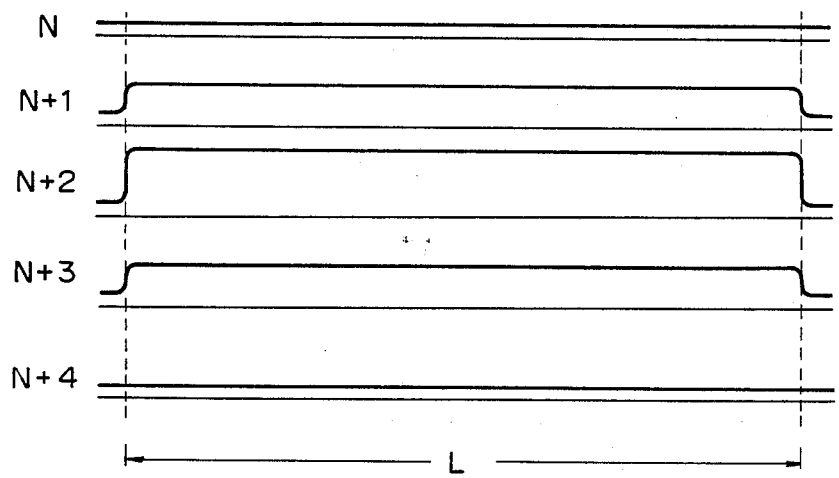
FIG. 11 is a waveform diagram showing a reproduction signal in the case where no angle difference occurs in the optical card reading apparatus using the photo diode.

Therefore, the reproduction signal of the track T becomes as shown in FIG. 11. Namely, the reproduction signal cannot be obtained by the Nth scan. As the optical card 101 is moved in the direction of the arrow C for the interval from the Nth scan to the (N+2)th scan, the reproduction signal increases. The reproduction signal becomes maximum by the (N+2)th scan at which the scan locus X of the laser beam substantially coincides with the center of the track T. After the elapse of the (N+2)th scan, the reproduction signal of the track T gradually decreases. In the (N+4)th scan, the reproduction signal of the track T cannot be obtained. Thereafter, the reproduction signal of the next track is gradually obtained.

When the direction of the scan locus X of the laser beam completely coincides with the direction of the recording track T, the (N+1)th to (N+3)th reproduction signals which are obtained for the interval between the Nth scan and the (N+4)th scan for which no reproduction signal is derived are the signals which were obtained by reproducing the whole data interval L of one track T.

Figure 12:
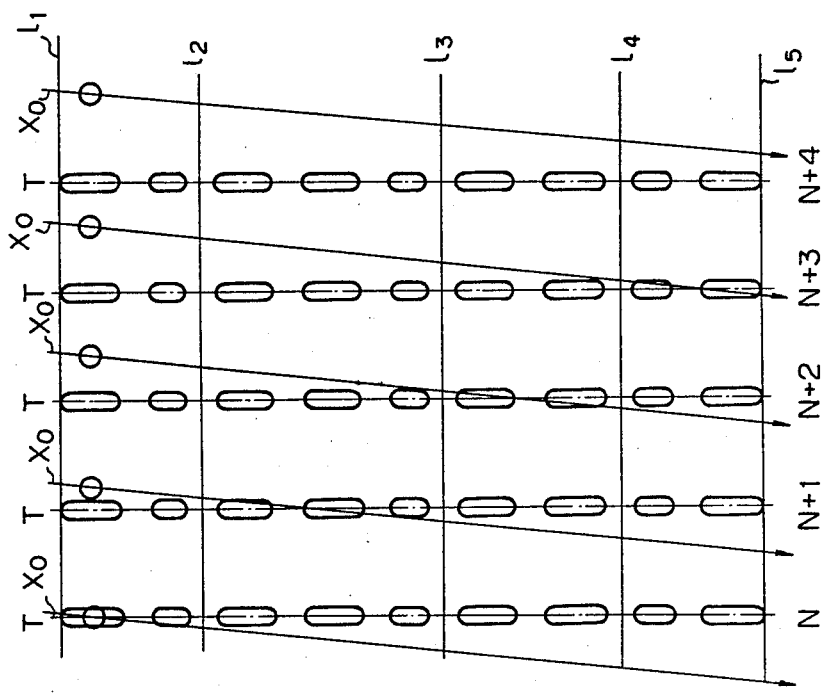
FIG. 12 is a schematic diagram which is used to explain the case where an angle difference occurs in the optical card reading apparatus using the photo diode.

However, when the scan direction of the laser beam is different from the direction of the track T, the laser beam scans as shown in, e.g., FIG. 12. Namely, at the Nth scan, although the scan locus $X_0$ exists on the track T in the first portion of the scan, the scan locus $X_0$ does not exist on the track T in the latter half of the scan. By repeating the scan, the first portion of the scan locus $X_0$ is away from the first portion of the track T. The latter half portion of the scan locus $X_0$ approaches the latter half portion of the track T. At the (N+3)th scan, the scan locus $X_0$ exists on the track T in the latter half portion of the scan, but the scan locus $X_0$ does not exist on the track T in the former half portion of the scan. At the (N+4)th scan, the whole scan locus $X_0$ does not exist on the track T.

Figure 13:
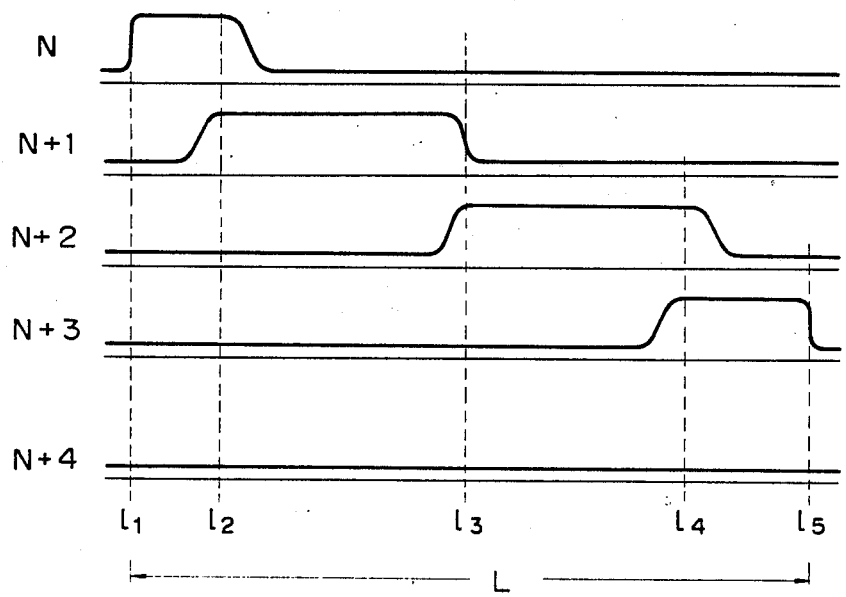
FIG. 13 is a waveform diagram showing a reproduction signal in the case where an angle difference occurs in the optical card reading apparatus using the photo diode.

Therefore, the reproduction signal of the track T becomes as shown in FIG. 13. Namely, at the Nth scan, the large reproduction signal is obtained in the former half portion $(l_1-l_2)$ of the track T. Thereafter, the reproduction signal gradually decreases and the reproduction signal is not soon obtained. For the interval from the Nth scan to the (N+3)th scan, the interval for which the large reproduction signal is obtained each time the scan is repeated is shifted to the latter half portion of the track T. At the (N+1)th scan, the large reproduction signal is derived for the interval of $(l_2-l_3)$ of the track T. At the (N+2)th scan, the large reproduction signal is derived for the interval of $(l_3-l_4)$ of the track T. At the (B+3)th scan, the large reproduction signal is obtained for the interval of $(l_4-l_5)$ of the track T. At the (N+4)th scan, no reproduction signal is derived.

As will be obvious from FIG. 13, when the direction of the scan locus $X_0$ of the laser beam differs from the direction of the track T, even at any scan among the Nth to (N+4)th scans, the data interval L of one track is never reproduced.

However, as shown in FIG. 13, in the data interval L of one track, the data is completely reproduced at the Nth scan for the interval of $(l_1-l_2)$. The data is completely reproduced at the (N+1)th scan for the interval of $(l_2-l_3)$. The data is completely reproduced at the (N+2)th scan for the interval of $(l_3-l_4)$. The data is completely reproduced at the (N+3)th scan for the interval of $(l_4-l_5)$. Therefore, all of the reproduction signals for the data interval L of one track can be perfectly obtained by use of the reproduction signals which are derived for the period from the Nth scan to the (N+3)th scan. Namely, the reproduction signal of the Nth scan is used for the interval of $(l_1-l_2)$. The reproduction signal at the (N+1)th scan is used for the interval of $(l_2-l_3)$. The reproduction signal at the (N+2)th scan is used for the interval of $(l_3-l_4)$. The reproduction signal at the (N+3)th scan is used for the interval of $(l_4-l_5)$. In this manner, the data of one track can be perfectly reproduced as in the case where the scan direction coincides with the direction of the recording track.

As mentioned above, even if the scan direction of the laser beam does not completely coincide with the direction of the recording track, by use of the reproduction signals obtained by a plurality of scanning operations, the data of one track can be perfectly reproduced. In the third embodiment, the data of one track can be completely reproduced by use of the reproduction signals obtained by a plurality of scanning operations.

Figure 14:
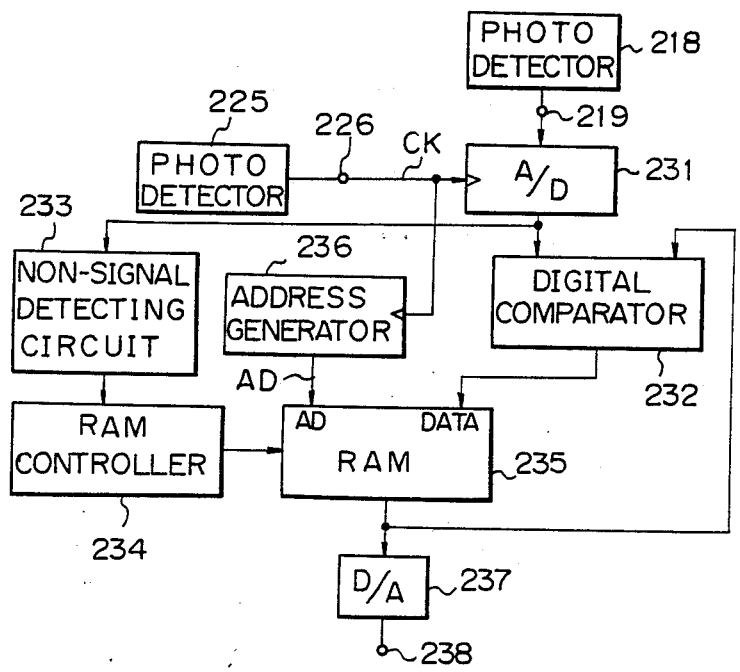
FIG. 14 is a block diagram of the third embodiment of the invention.

FIG. 14 shows the third embodiment of the invention. In FIG. 14, the reproduction signal of the optical card 101 which is taken out from the terminal 219 of the first photo detector 218 (refer to FIG. 9) is supplied to an A/D converter 231. A one-dimensional lattice clock CK which is taken out from the terminal 226 of the second photo detector 225 (refer to FIG. 9) is supplied to the A/D converter 231. The reproduction signal which is output from the second photo detector 218 is sampled and digitized by the A/D converter 231 in response to the one-dimensional lattice clock CK.

The output of the A/D converter 231 is supplied to a digital comparator 232 and to a non-signal detecting circuit 233. The non-signal detecting circuit 233 detects whether the reproduction signal is not obtained at all by one scan or not. The detection output of the non-signal detecting circuit 233 is supplied to a RAM controller 234. The operation of a RAM 235 is controlled by the RAM controller 234.

The non-dimensionasl lattice clock CK which is output from the second photo detector 225 is supplied to an address generator 236. An address signal AD which is stepped up in response to the one-dimensionaol lattice clock CK is formed by the address generating circuit 236. The address signal AD is stepped up for one scan and is reset after completion of one scan. Since the one-dimensional lattice clock CK is generated in correspondence to the scan position of the laser beam as mentioned above, the address signal AD corresponds to the scan position of the laser beam.

In the case of reading while scanning the laser beam, a variation occurs in the oscillating speed of the galvano mirror 215 every scan. Therefore, if clocks of a constant period are used as a sampling clock of the reproduction signal and as a stepping clock of the address generating circuit 226, a fluctuation occurs in the sampling position of the reproduction signal every scan. Therefore, there occurs a case where the address signal AD does not perfectly correspond to the scan position of the laser beam every scan.

In this embodiment, the one-dimensional lattice clock CK which changes in correspondence to the motion of the galvano mirror 215 is used as a sampling clock of the reproduction signal and a stepping clock of the address generating circuit 226. Therefore, the sampling position of the reproduction signal is always constant every scan. The address signal AD perfectly corresponds to the scan position of the laser beam every scan.

The RAM 235 is cleared when the non-signal is detected by the non-signal detecting circuit 225. Next, the reproduction signal data obtained by one scan is stored into the address designated by the address signal AD.

In the next scan, the reproduction signal data from the A/D converter 231 is supplied to the digital comparator 232. The address signal AD corresponding to the position of the reproduction signal data of the A/D converter 231 at that time is supplied from the address generating circuit 236 to the RAM 235. The data in this address is read out of the RAM 235 and supplied to the digital comparator 232.

The output data of the A/E converter 231 is compared with the output data of the RAM 235 by the digital comparator 232. The larger data is output from the digital comparator 232. This data is written into the corresponding address in the RAM 235. The larger data in the corresponding address is written into the RAM 235 until one scan is finished.

The similar processes are repeated hereinafter in the case of the next scan. The operations similar to the above are repeatedly performed until the non-signal is detected by the non-signal detecting circuit 233.

By repeating the foregoing processes, the reproduction signal data having the maximum level at a plurality of scans at the corresponding scan position is respectively stored into each address in the RAM 235.

As mentioned above, even when the scan direction of the laser beam differs from the direction of the recording track, any portion in one track is reproduced at each scan among a plurality of scans. In the portion which is being reproduced, the reproduction signal increases. Therefore, as mentioned above, by storing the reproduction signal at the maximum level in a plurality of scans in the corresponding address into the RAM 235, all of the reproduction signal data which is obtained from one track is stored into the RAM 235.

When the non-signal is detected by the non-signal detecting circuit 233, the reproduction signal data of one track stored in the RAM 235 is read out. This reproduction signal data is supplied to a digital-to-analog converter (D/A converter) 237. The output of the D/A converter 237 is output from an output terminal 238. The reproduction signal including all of the data of one track is taken out from the output terminal 238.

In this manner, according to the embodiment, the accurate reproduction signal including all data of one track can be taken out from the output terminal 238 without performing the tracking control.

Figure 15:
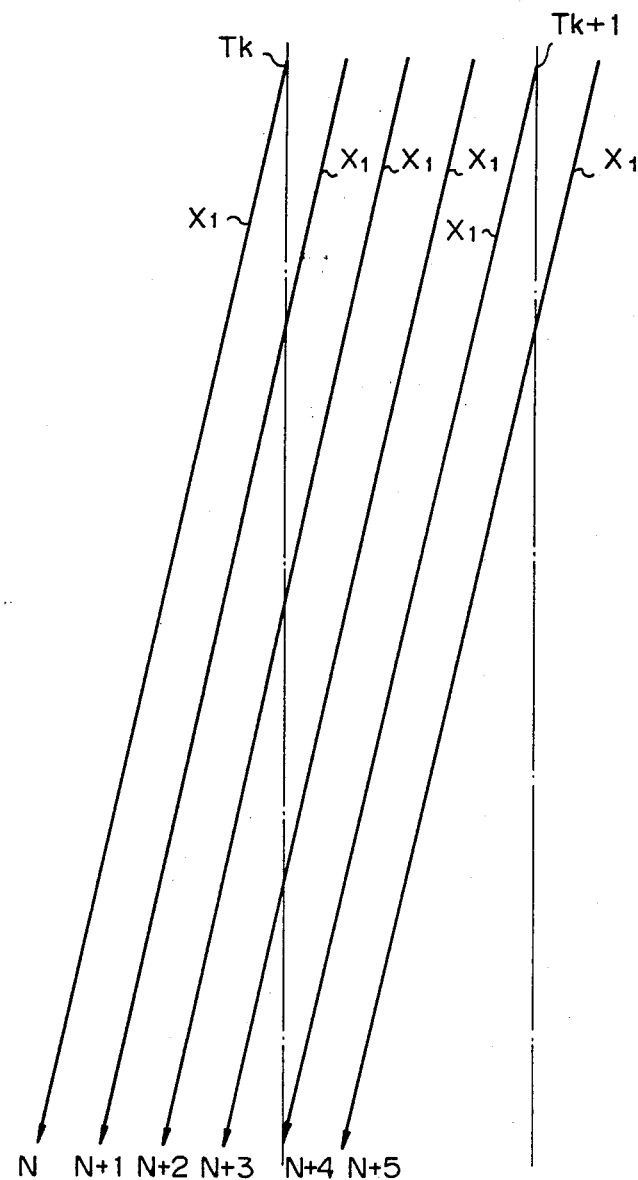
FIG. 15 is a schematic diagram which is used to explain the case where a large angle difference occurs in the optical card reading apparatus using the photo diode.
Figure 16:
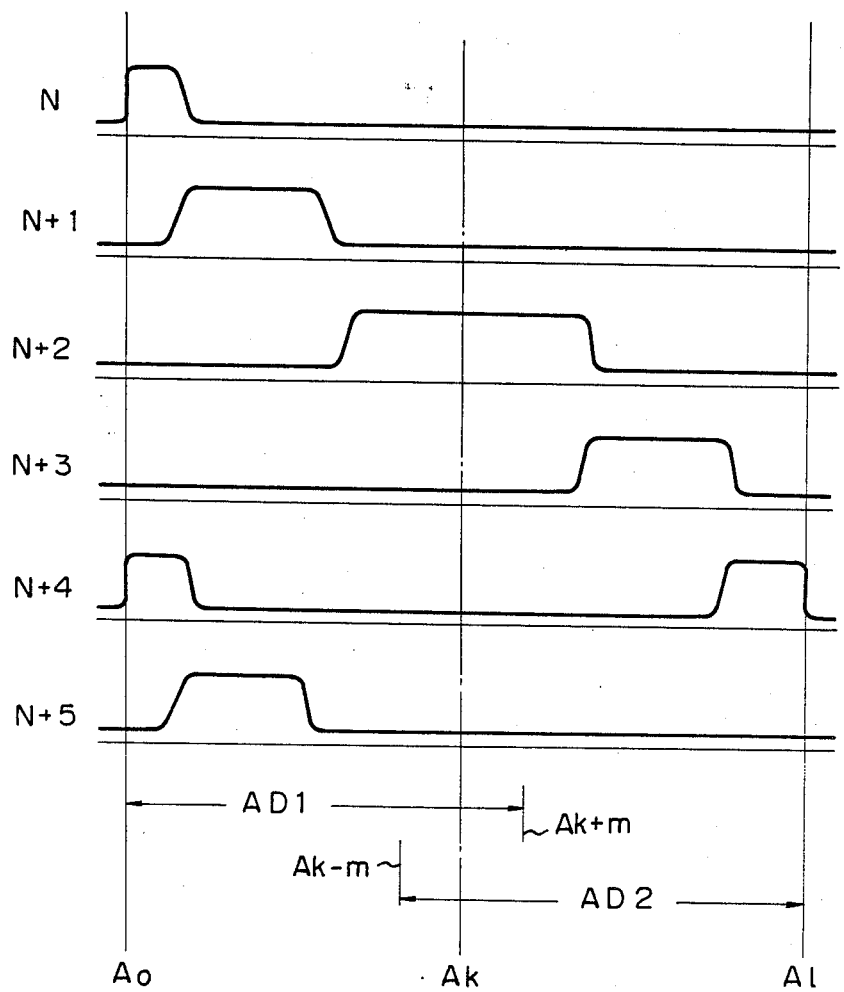
FIG. 16 is a waveform diagram showing a reproduction signal in the case where a large angle difference occurs in the optical card reading apparatus using the photo diode, FIG. 17 consisting of A and B is a block diagram of the fourth embodiment of the invention, FIG. 18 consisting of A and B is a block diagram of the fifth embodiment of the invention.

When the inclination difference of the scan direction of the laser beam to the direction of the recording track becomes so large that the laser beam scans two tracks, it is impossible to cope with such a case by the processes shown in the foregoing third embodiment. Namely, as shown in FIG. 15, when the direction of a scan locus $X_1$ is largely different from the directions of the recording track $T_k$ and of the next track $T_{k+1}$, at the (N+4)th scan, not only the track $T_k$ but also the track $T_{k+1}$ are scanned. On the other hand, the scan period of non-signal is eliminated. At the (N+5)th scan, the former half portion of the track $T_{k+1}$ is scanned. Therefore, the reproduction signal becomes as shown in FIG. 16. Namely, at the Nth scan, the former half portion of the track $T_k$ is reproduced. At the (N+1)th scan, the portion between the former half portion and the central portion of the track $T_k$ is reproduced. At the (N+2)th scan, the central portion of the track $T_k$ is reproduced. At the (N+3)th scan, the portion between the central portion and the latter half portion of the track $T_k$ is reproduced. At the (N+4)th scan, the former half portion of the track $T_{k+1}$ is reproduced and at the same time, the latter half portion of the track $T_k$ is reproduced. At the (N+5)th scan, the portion between the former half portion and the central portion of the track $T_{k+1}$ is reproduced. In such a case, the scan period of non-signal is not caused for one scan. It is unclear that at which scan and until which position the data is obtained from the reproduction signal data of one track.

Figure 17B:
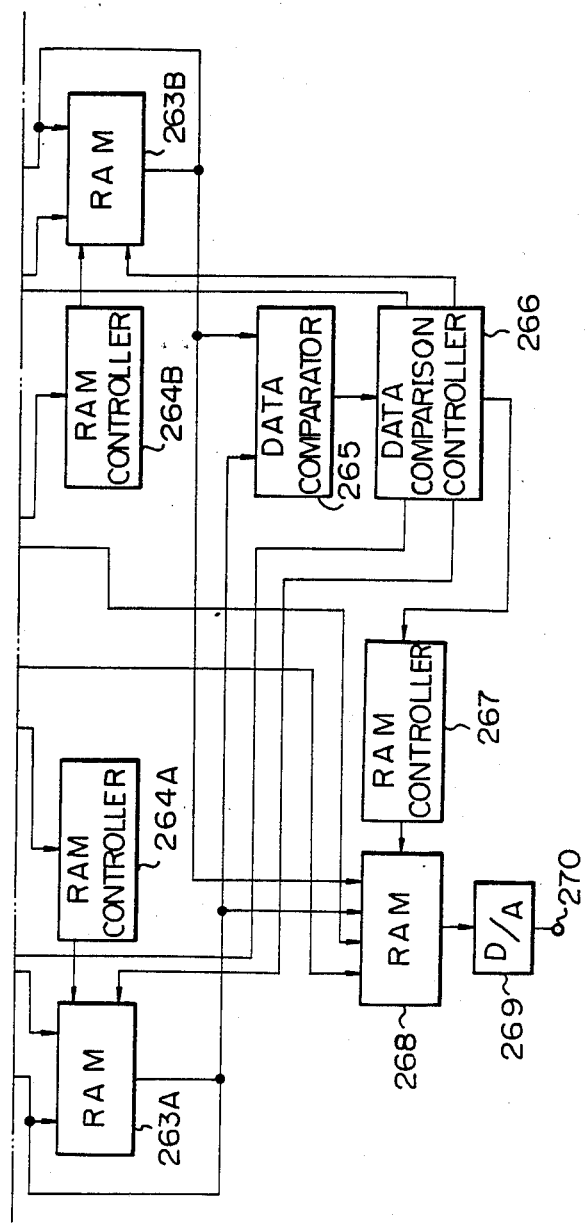

FIG. 17 shows the fourth embodiment of the invention. In this embodiment, the reproduction signal data which is obtained from the former half portion of the scan and the reproduction signal data which is derived from the latter half portion of the scan are divided. The reproduction signal data in the former half portion and latter half portion of one track is respectively obtained by use of the reproduction signal data which is derived by a plurality of scans in each of the former half portion and latter half portion. In this manner, even when the inclination difference of the scan direction of the laser beam to the direction of the track is large, the invention can cope with this case.

In FIG. 17, the reproduction signal of the optical card which is taken out from a terminal 252 of a photo detector 251 is supplied to an A/D converter 253. The one-dimensional lattice clock CK which is taken out from a terminal 255 of a photo detector 254 is supplied to the A/D converter 253. The constitutions of the optical card feeding mechanism and photo detectors 251 and 254 are similar to those in the foregoing third embodiment. The reproduction signal which is output from the photo detector 251 is sampled and digitized by the A/D converter 253 in response to the one-dimensional lattice clock CK.

The one-dimensional lattice clock CK which is output from the photo detector 254 is supplied to an address generator 256. Two address signals $AD_1$ and $AD_2$ which are stepped up by the one-dimensional lattice clock CK are generated from the address generating circuit 256. As shown in FIG. 16, the address signal $AD_1$ is stepped up from the first address $A_0$ to the address $A_{k+m}$. The address signal $AD_2$ is stepped up from the address $A_{k-m}$ to the address $A_l$. As shown in FIG. 16, the addresses ($A_0$–$A_l$) correspond to one scan period. The address $A_k$ corresponds to the almost central portion of one scan period. Therefore, in the former half of one scan, the address signal $AD_1$ is output. In the latter half, the address signal $AD_2$ is output. At the center of one scan, the address signals $AD_1$ and $AD_2$ are overlapped and output for the interval between the address $A_{k-m}$ and the address $A_{k+m}$.

In FIG. 17, the output of the A/D converter 253 is supplied to non-signal detecting circuits 257A and 257B and also supplied to digital comparators 258A and 258B. The non-signal detecting circuit 257A detects whether the reproduction signal in the former half portion of one scan is the non-signal or not. The non-signal detecting circuit 257B detects whether the reproduction signal in the latter half portion of one scan is the non-signal or not. The detection outputs of the non-signal detecting circuits 257A and 257B are supplied to RAM controllers 259A and 259B, respectively. The RAM controllers 259A and 259B control the operations of RAMs 260A and 260B, respectively.

When the non-signal is respectively detected by the non-signal detecting circuits 257A and 257B, the RAMs 260A and 260B are cleared. Next, the reproduction signal data obtained in the former half of one scan is stored into a predetermined address in the RAM 260A by the address signal $AD_1$. The reproduction signal data obtained in the latter half is stored into a predetermined address in the RAM 260B by the address signal $AD_2$.

In the former half portion of the next scan, the reproduction signal data from the A/D converter 253 is supplied to the digital comparator 258A. The address corresponding to the position of the reproduction signal data of the A/D converter 253 at this time is supplied from the address generating circuit 256 to the RAM 260A. The data in this address is read out of the RAM 260A and supplied to the digital comparator 258A. The output data of the A/D converter 253 and the output data of the RAM 260A are compared by the digital comparator 258A. The larger data is output from the digital comparator 258A. This data is written into the corresponding address in the RAM 260A.

In the latter half portion of this scan, the reproduction signal data from the A/D converter 253 is supplied to the digital comparator 258B. The address corresponding to the position of the reproduction signal data of the A/D converter 253 at this time is supplied from the address generating circuit 256 to the RAM 260B. The data in this address is read out of the RAM 260B and supplied to the digital comparator 258B. The output data of the A/D converter 253 is compared with the output data of the RAM 260B by the digital comparator 258B. The larger data is output from the digital comparator 258B. This data is written into the corresponding address in the RAM 260B.

In the former half portion and latter half portion of the scan, the similar operations are repeated until the non-signal is detected by the non-signal detecting circuits 257A and 257B.

By repeating such processes, the reproduction signal data having the maximum level at a plurality of scans at the corresponding scan position in the former half portion of the scan is respectively stored into each address in the RAM 260A. The reproduction signal data having the maximum level at a plurality of scans at the corresponding scan position in the latter half portion of the scan is respectively stored into each address in the RAM 260B. Thus, all of the reproduction signal data in the former half portion of the track is stored into the RAM 260A. All of the data in the latter half portion of the track is stored into the RAM 260B.

When the non-signal is detected by the non-signal detecting circuits 257A and 257B, the data of the RAM 260A is transferred to a RAM 261A. The data of the RAM 260B is transferred to a RAM 261B. The RAMs 261A and 261B are controlled by RAM controllers 262A and 262B.

When the non-signal is then detected, the data of the RAM 261A is transferred to a RAM 263A. The data of the RAM 261B is transferred to a RAM 263B. At the same time, the data of the RAM 260A is transferred to the RAM 261A and the data of the RAM 260B is transferred to the RAM 261B. The RAM 263A is controlled by a RAM controller 264A. The RAM 263B is controlled by a RAM controller 264B.

For the interval after the non-signal was detected until the next non-signal is detected, the reproduction signal data in the former half portion of one track and the reproduction signal data in the latter half portion are respectively stored into the RAMs 260A and 260B. Therefore, as described above, the data stored in the RAMs 260A and 260B is respectively transferred to the RAMs 261A, 263A, 261B and 263B. Thus, the reproduction signal data in the former half portions of two continuous tracks is stored into the RAMs 261A and 263B. The reproduction signal data in the latter half portions of two continuous tracks is stored into the RAMs 261B and 263B.

The reproduction signal data in the former half portions of two continuous tracks stored in the RAMs 261A and 263A and the reproduction signal data in the latter half portions of two continuous tracks stored in the RAMs 261B and 263B are transferred to a data comparator 265. The data comparator 265 is provided to detect the reproduction signal data in the latter half portion of the track corresponding to the reproduction signal data in the former half portion. This detection is performed using the reproduction signal recording data in the addresses $(A_{k-m}-A_{k+m})$ which are overlapped in the former and latter half portions.

Namely, as mentioned above, the address signals $AD_1$ and $AD_2$ overlap in the addresses $(A_{k-m}-A_{k+m})$. Therefore, if the reproduction signal data in the former half portion and the reproduction signal data in the latter half portion are obtained from the same track, there is a correlation between both reproduction signal data which are obtained in the overlapped addresses $(A_{k-m}-A_{k+m})$.

The reproduction signal data in the addresses $(A_{k-m}-A_{k+m})$ in the RAMs 261A and 263A and the reproduction signal data in the addresses $(A_{k-m}-A_{k+m})$ in the RAMs 261B and 263B are matrix operated by the data comparator 265 and the corresponding relation is determined. The decision output is supplied to a data comparison controller 266. In response to the decision output, the data comparison controller 266 controls the reading operations of the RAMs 261A, 263A, 261B and 263B and also controls a RAM 268 through a RAM controller 267.

Namely, a check is made to see if there is a correlation between the reproduction signal data in the addresses $(A_{k-m}-A_{k+m})$ in the RAM 263A and the reproduction signal data in the addresses $(A_{k-m}-A_{k+m})$ in the RAM 263B. If there is the correlation, the data stored in the RAM 263A is written into the RAM 268 and thereafter, the data stored in the RAM 263B is written into the RAM 268.

If there is no correlation, a check is made to see if there is a correlation between the reproduction signal data in the addresses $(A_{k-m}-A_{k+m})$ in the RAM 263A and the reproduction signal data in the addresses $(A_{k-m}-A_{k+m})$ in the RAM 261B or not. If there is the correlation, the data stored in the RAM 263A is written into the RAM 268 and thereafter, the data stored in the RAM 263B is written into the RAM 268.

If there is no correlation, a check is made to see if there is a correlation between the reproduction signal data in the addresses $(A_{k-m}-A_{k+m})$ in the RAM 261A and the reproduction signal data in the addresses $(A_{k-m}-A_{k+m})$ in the RAM 263B or not. If there is the correlation, the data in the RAM 261A is written into the RAM 268 and thereafter, the data in the RAM 263B is written into the RAM 268.

If there is no correlation, a check is made to see if there is a correlation between the reproduction signal data in the addresses $(A_{k-m}-A_{k+m})$ in the RAM 261A and the reproduction signal data in the addresses $(A_{k-m}-A_{k+m})$ in the RAM 261B or not. If there is the correlation, the data in the RAM 261A is written into the RAM 268 and thereafter, the data in the RAM 261B is written into the RAM 268.

By controlling in this manner, the reproduction signal data of one track is stored into the RAM 268. After the reproduction signal data of one track was stored into the RAM 268, the data of the RAM 268 is read out. The output of the RAM 268 is supplied to a D/A converter 269 and taken out from an output terminal 270. The reproduction signal including all of the data of one track is taken out from the output terminal 270.

When the difference of the scan direction of the laser beam to the direction of the recording track is further large, it is sufficient to further finely divide the scan period. The division number of the scan period is determined in consideration of the accuracy of the feeding mechanism.

Figure 18B:
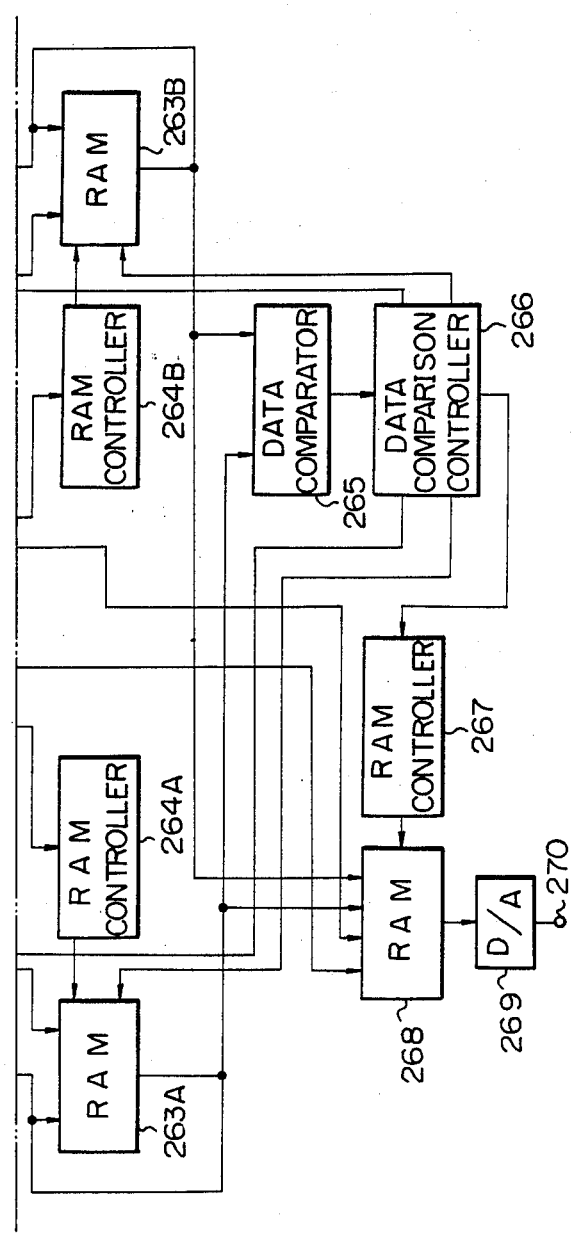

FIG. 18 shows the case (the fifth embodiment) where the embodiment shown in FIG. 17 is realized by a reading apparatus using a line sensor as in the first and second embodiments. In the case of using the line sensor 110, as shown in FIG. 18, a transfer clock is supplied from a clock generating circuit 271 to the line sensor 110. This transfer clock is supplied to the A/D converter 253 and address generating circuit 256.

Figure 19:
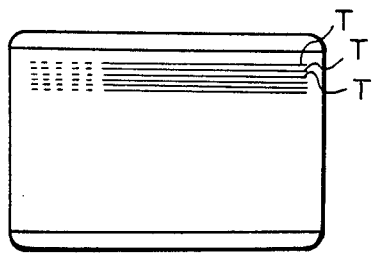
FIG. 19 is a plan view of another example of the optical card.

As shown in FIG. 19, the present invention can be similarly applied to the case of reproducing an optical card in which tracks T are formed in parallel in the longitudianl direction of the optical card.

What is claimed is:

1. An optical card reproducing apparatus characterized by comprising:
   an optical card in which data is recorded as a plurality of tracks on an optical recording medium;
   reproducing means having a detector for reproducing said data by detecting data signals corresponding to the reflected light of the irradiated light from a light source by said optical recording medium along plural scanning lines traversing the area of said card on which said tracks are located;
   clock generating means for supplying a sampling clock to said detector; and
   period setting means connected to said detector responsive to said data signals detected in adjacent scanning lines for setting a period during each of said scanning lines for which said reproducing means reproduces the data recorded on one track in response to signals from among said scanning lines.

2. An optical card reproducing apparatus according to claim 1, wherein said reproducing means reads and scans each track among said plurality of tracks a plurality of times.

3. An optical card reproducing apparatus according to claim 2, characterized by comprising memory means for storing an output signal from said detector.

4. An optical card reproducing apparatus according to claim 3, wherein said detector is a photo detector and there is provided comparing means for sequentially comparing the level of the output signal of said photo detector stored in said memory means with the level of the next output signal of the photo detector, and when the level of the output signal from the photo detector is higher than the level of the output signal stored in the memory means, the memory content of the memory means is corrected.

5. An optical card reproducing apparatus according to claim 4, characterized in that said period setting means has non-signal detecting means for detecting a non-signal portion between said tracks.

6. An optical card reproducing apparatus according to claim 3, characterized by comprising address generating means for generating address signals to divide the output of said detector corresponding to one track into a plurality of portions and to store into said memory means.

7. An optical card reproducing apparatus according to claim 6, characterized in that said memory means consists of at least two or more memory devices.

8. An optical card reproducing apparatus according to claim 7, characterized by comprising synthesizing means for synthesizing said data divided and stored in said memory devices to form an information signal corresponding to one track on the basis of the outputs of said period setting means and of said address generating means.

9. An optical card reproducing apparatus according to claim 8, characterized in that said address generating means generates address signals which coincide with address signals generated for a different scan.

10. An optical card reproducing apparatus according to claim 9, wherein said synthesizing means synthesizes the address signals whose portions coincide.

11. An optical card reproducing apparatus according to claim 10, characterized in that said coinciding portions of the address signals from said address generating means are the divided portions of the reproduction output signal from said detector which is divided by said address signals.

12. An optical card reproducing apparatus according to claim 11, characterized in that said detector is a line sensor.

13. An optical card reproducing apparatus according to claim 11, characterized in that said light source is a laser beam source and said reproducing means has scanning means for scanning the irradiated light from said light source in a direction approximately parallel with said track.

14. An optical card reproducing apparatus according to claim 13, characterized in that said scanning means consists of a scan mirror which oscillates in said track direction and driving means for driving said scan mirror.

15. An optical card reproducing apparatus according to claim 14, characterized in that said clock generating means is optical clock generating means for generating said sampling clock due to the oscillation of said scan mirror.

16. An optical card reproducing apparatus according to claim 15, characterized in that said optical clock generating means consists of a laser beam source, a one-dimensional lattice, and a photo detector.

17. An optical card reproducing apparatus according to claim 16, wherein the detection output of said photo detector of said optical clock generating means is fed back and supplied to said driving means of said scan mirror.

18. An optical card reproducing apparatus according to claim 5, characterized by comprising address generating means for generating address signals to divide the detection output of one track of said detector into a plurality of portions and to store into said memory means.

19. An optical card reproducing apparatus according to claim 18, characterized in that said memory means consists of at least two or more memory devices.

20. An optical card reproducing apparatus according to claim 19, characterized by comprising synthesizing means for synthesizing said data divided and stored in said respective memories to an information signal corresponding to one track on the basis of the outputs of said period setting means and of said address generating means.

21. An optical card reproducing apparatus according to claim 20, characterized in that said address generating means generates address signals which coincide with address signals generated for a different scan.

22. An optical card reproducing apparatus according to claim 21, characterized in that said synthesizing means synthesizes the address signals whose portions coincide.

23. An optical card reproducing apparatus according to claim 22, characterized in that the overlapped portions of said address signals from said address generating means are the divided portions of the reproduction output signal from said detector which is divided by said address signals.

24. An optical card reproducing apparatus according to claim 23, characterized in that said detector is a line sensor.

25. An optical card reproducing apparatus according to claim 22, characterized in that said light source is a laser beam source and said reproducing means has scanning means for scanning the irradiated light from said light source in a direction approximately parallel with said track.

26. An optical card reproducing apparatus according to claim 25, characterized in that said scanning means consists of a scan mirror which oscillates in said track direction and driving means for driving said scan mirror.

27. An optical card reproducing apparatus according to claim 26, characterized in that said clock generating means is optical clock generating means for generating said sampling clock due to the oscillation of said scan mirror.

28. An optical card reproducing apparatus according to claim 27, characterized in that said optical clock generating means consists of a laser beam source, a one-dimensional lattice, and a photo detector.

29. An optical card reproducing apparatus according to claim 28, wherein the detection output of said photo detector of said optical clock generating means is fed back and supplied to said driving means of said scan mirror.

30. An optical card reproducing apparatus characterized by comprising:
   an optical card in which data is recorded as a plurality of tracks on an optical recording medium;
   reproducing means having a detector for reproducing said data by detecting the reflected light of the irradiated light from a laser beam source by said optical recording medium;
   scanning means for scanning the irradiated light from said laser beam source along plural scanning lines extending in a direction approximately parallel with said tracks; whereby one or more of said scanning lines crosses each data track; and
   clock generating means responsive to said scanning means for supplying a sampling clock to said detector, whereby said sampling clock is synchronized with said data irrespective of variations in scanning speed;
   further characterized in that said scanning means consists of a scan mirror which oscillates in the track direction and driving means for driving said scan mirror, and
   said clock generating means is optical clock generating means for generating said sampling clock by the oscillation of said mirror and consists of a laser beam source, a one-dimensional lattice, and a photo detector;
   wherein the detection output of said photo detector of said optical clock generating means is fed back and supplied to said driving means of said scan mirror.

* * * * *